(12) United States Patent
Yasuda et al.

(10) Patent No.: US 11,847,840 B2
(45) Date of Patent: Dec. 19, 2023

(54) VISUAL NOTIFICATION OF DISTRACTED DRIVING

(71) Applicant: Toyota Research Institute, Inc., Los Altos, CA (US)

(72) Inventors: Hiroshi Yasuda, San Francisco, CA (US); Manuel Ludwig Kuehner, Mountain View, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 137 days.

(21) Appl. No.: 17/409,906

(22) Filed: Aug. 24, 2021

(65) Prior Publication Data

US 2023/0066670 A1 Mar. 2, 2023

(51) Int. Cl.
*G06V 20/59* (2022.01)
*B60Q 9/00* (2006.01)
*G06F 3/14* (2006.01)
*G06T 7/70* (2017.01)

(52) U.S. Cl.
CPC ............ *G06V 20/597* (2022.01); *B60Q 9/00* (2013.01); *G06F 3/14* (2013.01); *G06T 7/70* (2017.01); *G06T 2207/30196* (2013.01); *G06T 2207/30268* (2013.01)

(58) Field of Classification Search
CPC ........ G06V 20/597; G06V 40/18; B60Q 9/00; G06F 3/14; G06T 7/70; G06T 2207/30196; G06T 2207/30268
See application file for complete search history.

(56) References Cited

U.S. PATENT DOCUMENTS

| | | | |
|---|---|---|---|
| 9,315,195 B2 | 4/2016 | Armitage et al. | |
| 10,564,714 B2 | 2/2020 | Marggraff et al. | |
| 10,569,650 B1* | 2/2020 | Riley, Sr. | B60W 50/16 |
| 11,223,381 B2* | 1/2022 | Edwards | H04M 1/0264 |
| 2010/0033333 A1* | 2/2010 | Victor | A61B 5/7264 340/576 |
| 2016/0267335 A1* | 9/2016 | Hampiholi | B60K 28/066 |
| 2017/0329329 A1* | 11/2017 | Kamhi | G05D 1/0088 |
| 2022/0121867 A1* | 4/2022 | Arar | G06V 20/588 |
| 2023/0066670 A1* | 3/2023 | Yasuda | G06V 40/18 |

* cited by examiner

*Primary Examiner* — Md K Talukder
(74) *Attorney, Agent, or Firm* — Christopher G. Darrow; Darrow Mustafa PC (57) ABSTRACT

A distracted driver can be informed of his or her distraction by a visual notification. It can be detected whether a driver of a vehicle is focused on a non-critical object located within the vehicle. In response to detecting that the driver of the vehicle is focused on a non-critical object located within the vehicle, an amount of time the driver is focused on the non-critical object can be determined. When the amount of time exceeds a threshold amount of time, a visual notification of distracted driving can be caused to be presented on or visually adjacent to the non-critical object.

18 Claims, 5 Drawing Sheets

Detect whether a driver of a vehicle is focused on a non-critical object located within the vehicle
310

Responsive to detecting that the driver of the vehicle is focused on a non-critical object located within the vehicle, determining an amount of time the driver is focused on the non-critical object
320

When the amount of time exceeds a threshold amount of time, causing a visual notification of distracted driving to be presented on or visually adjacent to the non-critical object
330

VISUAL NOTIFICATION OF DISTRACTED DRIVING

FIELD

The subject matter described herein relates in general to vehicles and, more particularly, to distracted driving of a vehicle.

BACKGROUND

The potential for vehicle accidents by driver error has been a longstanding concern. Cellular phone usage (talking, texting, internet browsing, etc.) while driving is a serious problem. When a driver uses a cellular phone, the driver's focus on the road is necessarily reduced. Such a change in focus can compromise a driver's control of the vehicle, resulting in a diminished state of safety to the vehicle's occupants, the vehicle, and to individuals, property, and/or other vehicles in the vicinity of the vehicle.

SUMMARY

In one respect, the subject described herein is directed to a distracted driver notification system. The system includes one or more sensors configured to acquire driver gaze data. The system includes one or more processors operatively connected to the one or more sensors. The one or more processors can be configured to detect, using driver gaze data, whether the driver of a vehicle is focused on a non-critical object located within the vehicle. Responsive to detecting that the driver of the vehicle is focused on a non-critical object located within the vehicle, the one or more processors can be configured to determine an amount of time the driver is focused on the non-critical object. When the amount of time exceeds a threshold amount of time, the one or more processors can be configured to cause a visual notification of distracted driving to be presented on or visually adjacent to the non-critical object.

In another respect, the subject described herein is directed to a distracted driver notification method. The method can include detecting whether the driver of a vehicle is focused on a non-critical object located within the vehicle. The method can include, responsive to detecting that the driver of the vehicle is focused on a non-critical object located within the vehicle, determining an amount of time the driver is focused on the non-critical object. The method can include, when the counted amount of time exceeds a threshold amount of time, causing a visual notification of distracted driving to be presented on or visually adjacent to the non-critical object.

DETAILED DESCRIPTION

Arrangements described herein are directed to providing a visual notification of distracted driving to a vehicle driver. The visual notification can inform a driver of how long he or she has not been paying attention to the road. The visual notification can be presented on an object in the vehicle that is distracting the driver or visually adjacent to the object. According to arrangements herein, such a visual notification can provide a subtle notice to the driver without raising alarm among other passengers. The driver can choose to modify his or her behavior based on the visual notification.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Figure 1:
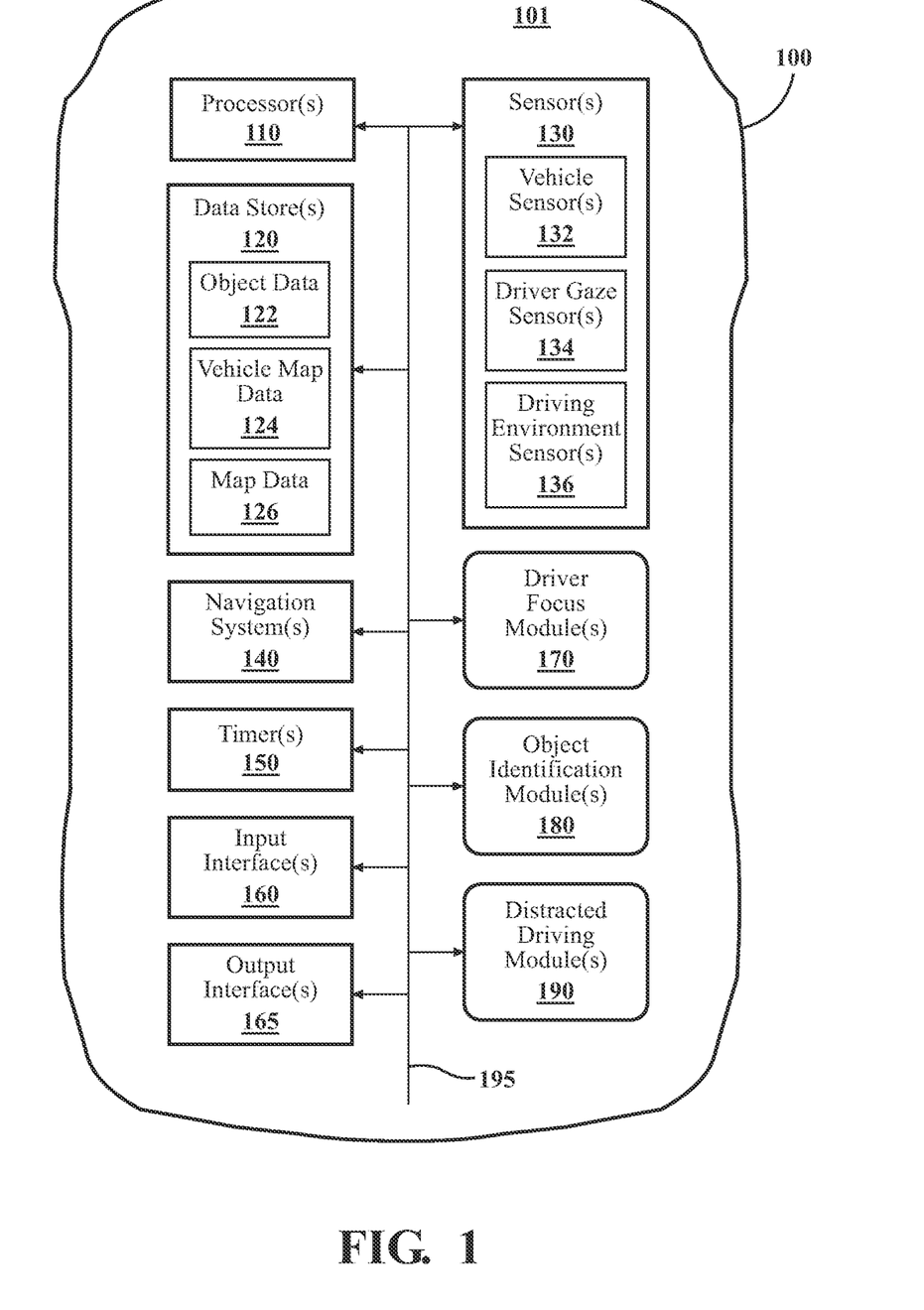
FIG. 1 is an example of a vehicle including a distracted driving notification system.

FIG. 1 is an example of a vehicle 100 configured for distracted driving notification. As used herein, "vehicle" means any form of motorized or powered transport. In one or more implementations, the vehicle 100 can be an automobile, a land-based craft, a watercraft, an aircraft or any other form of motorized or powered transport.

The vehicle 100 can include a distracted driving notification system 101. The distracted driving notification system 101 can include various elements. Some of the possible elements of the distracted driving notification system 101 are shown in FIG. 1 and will now be described. It will be understood that it is not necessary for the distracted driving notification system 101 to have all of the elements shown in FIG. 1 or described herein. The distracted driving notification system 101 can have any combination of the various elements shown in FIG. 1. Further, the distracted driving notification system 101 can have additional elements to those shown in FIG. 1. In some arrangements, the distracted driving notification system 101 may not include one or more of the elements shown in FIG. 1. Further, while the various elements may be located on or within a vehicle, it will be understood that one or more of these elements can be located external to the vehicle. Thus, such elements are not located on, within, or otherwise carried by the vehicle. Further, the elements shown may be physically separated by large distances. Indeed, one or more of the elements can be located remote from the vehicle 100.

The distracted driving notification system 101 can include one or more processors 110, one or more data stores 120, one or more sensors 130, one or more navigation systems 140, one or more timers 150, one or more input interfaces 160, one or more output interfaces 165, one or more driver focus modules 170, one or more object identification module(s) 180, and/or one or more distracted driving module(s) 190. Each of these elements will be described in turn below.

As noted above, the distracted driving notification system 101 can include one or more processors 110. "Processor"

means any component or group of components that are configured to execute any of the processes described herein or any form of instructions to carry out such processes or cause such processes to be performed. The processor(s) 110 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 110 can include at least one hardware circuit (e.g., an integrated circuit) configured to carry out instructions contained in program code. In arrangements in which there is a plurality of processors 110, such processors can work independently from each other or one or more processors can work in combination with each other.

The distracted driving notification system 101 can include one or more data stores 120 for storing one or more types of data. The data store(s) 120 can include volatile and/or non-volatile memory. Examples of suitable data stores 120 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 120 can be a component of the processor(s) 110, or the data store(s) 120 can be operatively connected to the processor(s) 110 for use thereby. The term "operatively connected," as used throughout this description, can include direct or indirect connections, including connections without direct physical contact.

In one or more arrangements, the data store(s) 120 can include object data 122. The object data 122 can include information about a plurality of different objects, including objects that may be found within the cabin of the vehicle 100. Examples of the object data 122 can include people, animals, and/or portable communication devices. The object data 122 can include information about objects that are part of the vehicle 100 (e.g., displays, infotainment screens, etc.) and/or the object that may not be a part of the vehicle (e.g., mobile devices). The object data 122 can include one or more images of the objects. The object data 122 can include size, measurements, and/or dimensions of the objects. The object data 122 can include any information about an object that can help to identify such an object when detected by one or more sensors.

In some arrangements, the object data 122 can include classification information about the objects in the object data 122. For instance, the classification information can include whether the object is a critical object or a non-critical object. A critical object can include an object or area that is important to the driver's ability to safely operate the vehicle. For instance, the front windshield of the vehicle can be classified as a critical object. A non-critical object can include an object or an area that that is not important to the driver's ability to safely operate the vehicle or an object or area that could be hazardous to the driver's ability to safely operate the vehicle. Examples of non-critical objects include mobile devices, personal communication devices, an in-vehicle screen (e.g., an infotainment screen), the floor, the radio, another passenger, or a glove box, just to name a few possibilities. In some arrangements, a non-critical object can be any object not located within the field of view of the front windshield of the vehicle. Indeed, while a side window, a side mirror, or a rear view mirror may be useful in a driver operating the vehicle, the driver cannot look solely at one of these items to operate the vehicle. Therefore, in this respect, the side window can the side window, the side mirror, or the rear view mirror In one or more arrangements, the data store(s) 120 can include vehicle map data 124. The vehicle map data 124 can include maps of the cabin of the vehicle 100. In some instances, the vehicle map data 124 can include information or data on all objects, structures, features, and/or landmarks in the cabin of the vehicle 100. The vehicle map data 124 can be in any suitable form. The vehicle map data 124 can include measurements, dimensions, distances, positions, coordinates, and/or information for one or more items included in the vehicle map data 124 and/or relative to other items included in the vehicle map data 124. For example, the vehicle map data 124 can include such information about the location of various objects (e.g., windows, infotainment screens, instrument panel, etc.) relative to a driver of the vehicle. The vehicle map data 124 can include a digital map with information about surfaces within the vehicle 100, including any displays or relatively large areas on which a notification can be projected. The vehicle map data 124 can be high quality and/or highly detailed.

In one or more arrangements, the data store(s) 120 can include map data 126. The map data 126 can include maps of one or more geographic areas. In some instances, the map data 126 can include information or data on roads, traffic control devices, road markings, street lights, structures, features, and/or landmarks in the one or more geographic areas. The map data 126 can be in any suitable form. In some instances, the map data 126 can include aerial views of an area. In some instances, the map data 126 can include ground views of an area, including 360 degree ground views. The map data 126 can include measurements, dimensions, distances, positions, coordinates, and/or information for one or more items included in the map data 126 and/or relative to other items included in the map data 126. The map data 126 can include a digital map with information about road geometry. In one or more arrangement, the map data 126 can include information about the ground, terrain, roads, surfaces, and/or other features of one or more geographic areas. The map data 126 can include elevation data in the one or more geographic areas. The map data 126 can define one or more ground surfaces, which can include paved roads, unpaved roads, land, and other things that define a ground surface. The map data 116 can be high quality and/or highly detailed.

The distracted driving notification system 101 can include one or more sensors 130. "Sensor" means any device, component and/or system that can detect, determine, assess, monitor, measure, quantify, acquire, and/or sense something. The one or more sensors can detect, determine, assess, monitor, measure, quantify, acquire, and/or sense in real-time. As used herein, the term "real-time" means a level of processing responsiveness that a user or system senses as sufficiently immediate for a particular process or determination to be made, or that enables the processor to keep up with some external process.

In arrangements in which the vehicle 100 includes a plurality of sensors, the sensors can work independently from each other. Alternatively, two or more of the sensors can work in combination with each other. In such case, the two or more sensors can form a sensor network.

The sensor(s) 130 can include any suitable type of sensor. Various examples of different types of sensors will be described herein. However, it will be understood that the embodiments are not limited to the particular sensors described.

The sensor(s) 130 can include one or more vehicle sensors 132. The vehicle sensor(s) 132 can be configured to detect, determine, assess, monitor, measure, quantify and/or sense information about the vehicle 100 itself (e.g., position, location, orientation, speed, acceleration, heading, etc.). As an example, the vehicle 100 can include one or more speedometers. Further, the vehicle sensor(s) 132 can be configured to detect, determine, assess, monitor, measure, quantify and/or sense information about a cabin of the vehicle 100. For instance, the vehicle sensor(s) 132 can include one or more cameras. The camera(s) can be configured to acquire vehicle cabin data, including data about one or more objects located within the cabin. The vehicle sensor(s) 132 can be any suitable sensor, now known or later developed.

The sensor(s) 130 can include one or more driver gaze sensors 134. The driver gaze sensor(s) 134 can be configured to detect, determine, assess, monitor, measure, quantify and/or sense information about a driver of the vehicle and, more particularly, the direction that the driver is looking. In some arrangements, the driver gaze sensor(s) 134 can be configured to monitor one or more vehicle occupants continuously, periodically, irregularly, or even randomly.

The driver gaze sensor(s) 134 can be any suitable sensor, now known or later developed. In one or more arrangements, the occupant sensor(s) 242 can include one or cameras, one or more eye sensors, one or more head sensors, one or more face sensors, one or more eye movement sensors, one or more eye tracking sensors, one or more eye position sensors, one or more eye orientation sensors, one or more head movement sensors, one or more head tracking sensors, one or more head position sensors, one or more head orientation sensors, and/or one or more gaze tracking sensors, just to name a few possibilities. The driver gaze sensor(s) 134 and/or the processor(s) 110 can be configured to determine the line of sight of the driver, for example, the direction in which the driver is looking.

The driver gaze sensor(s) 134, such as one or more cameras, can be mounted in the windshield, in the frame of the windshield, on arear-view mirror, on the dashboard, or mounted or suspended from the roof of the car, such that the eyes can be analyzed relative to the normal vector of vision for reading the road and vehicles that are on the same trajectory, oncoming, or traveling in a perpendicular direction. The driver gaze sensor(s) 134 can be embedded in or mounted on a side-view mirror to permit determination that the gaze is directed to the side-view mirror. The camera(s) can be a single lens fixed cameras. The camera(s) can have one or more lenses that allow a wide angle of observation. The camera(s) can contain optical components that can rotate or translate. The entire camera(s) can be mounted to rotate or translate to discern eye angles. The driver gaze sensor(s) 134 can be situated in the vicinity of the driver, such as, approximately above the driver.

The sensor(s) 130 can include one or more driving environment sensors 136. Such sensors can be used to detect, determine, assess, monitor, measure, quantify, acquire, and/or sense, directly or indirectly, something about the external environment of the vehicle 100. For instance, one or more of the driving environment sensor(s) 136 can be used to detect, determine, assess, monitor, measure, quantify, acquire, and/or sense, directly or indirectly, the presence of one or more objects in the external environment of the vehicle 100, the position or location of each detected object relative to the vehicle 100, the distance between each detected object and the vehicle 100 in one or more directions (e.g. in a longitudinal direction, a lateral direction, and/or other direction(s)), the elevation of a detected object, the speed of a detected object, the acceleration of a detected object, the heading angle of a detected object, and/or the movement of each detected obstacle.

The driving environment sensor(s) 136 can be any suitable sensor, now known or later developed. In one or more arrangements, the driving environment sensor(s) 136 can include one or more radar sensors, one or more lidar sensors, one or more sonar sensors, and/or one or more cameras.

The distracted driving notification system 101 can include one or more navigation systems 140. The navigation system(s) 140 can include a global positioning system, a local positioning system or a geolocation system. The navigation system(s) 140 can be implemented with any one of a number of satellite positioning systems, now known or later developed, including, for example, the United States Global Positioning System (GPS). Further, the navigation system(s) 140 can use Transmission Control Protocol (TCP) and/or a Geographic information system (GIS) and location services. For example, the GPS can include a GPS transceiver to determine the vehicle's latitude, longitude and/or altitude.

The distracted driving notification system 101 can include one or more timers 150. The timer(s) 150 can be any suitable timer, now known or later developed. The timer(s) 150 can be configured to count up or down from an event or starting point, such upon detection of distracted driving.

The distracted driving notification system 101 can include one or more input interfaces 160. An "input interface" includes any device, component, system, element or arrangement or groups thereof that enable information/data to be entered into a machine. The input interface(s) 160 can receive an input from a user (e.g., a person) or other entity. Any suitable input interface(s) 160 can be used, including, for example, a keypad, display, touch screen, multi-touch screen, button, joystick, mouse, trackball, microphone, gesture recognition (radar, lidar, camera, or ultrasound-based), and/or combinations thereof.

The distracted driving notification system 101 can include one or more output interfaces 165. An "output interface" includes any device, component, system, element or arrangement or groups thereof that enable information/data to be presented to a user (e.g., a person) or other entity. The output interface(s) 165 can present information/data to a user or other entity. The output interface(s) 165 can include a display, an earphone, a haptic device, a projector, and/or speaker. Some components of the distracted driving notification system 101 may serve as both a component of the input interface(s) 160 and a component of the output interface(s) 165.

The distracted driving notification system 101 can include one or more modules, at least some of which will be described herein. The modules can be implemented as computer readable program code that, when executed by a processor, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively or in addition, one or more data store 120 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The distracted driving notification system 101 can include one or more driver focus modules 170. The driver focus module(s) 170 can be configured to determine what a driver of the vehicle 100 is focused on. The driver focus module(s) 170 can be configured to analyze driver gaze data acquired by the driver gaze sensor(s) 134. Using the driver gaze data, the driver focus module(s) 170 can be configured to determine a direction that a driver is looking, such as a driver's line of sight. The driver focus module(s) 170 can be configured to do so by determining a head position, head orientation, eye position, eye orientation, and/or gaze of the driver using any suitable techniques, now known or later developed.

The driver focus module(s) 170 can be configured to compare the determined direction that the driver is looking to vehicle cabin data, as acquired by the vehicle sensor(s) 132 and/or vehicle map data 124. The driver focus module(s) 170 can be configured to determine an intersection between the direction that the driver is looking and an object in the vehicle 100. The driver focus module(s) 170 can be configured to determine that the in-vehicle object at the intersection is the focus of the driver.

The distracted driving notification system 101 can include one or more object identification modules 180. The object identification module(s) 180 can analyze sensor data captured by the sensor(s) 130 (e.g., the vehicle sensor(s) 132) to detect, identify, and/or classify an object. The object identification module(s) 180 can use any suitable technique, including, for example, template matching and other kinds of computer vision and/or image processing techniques and/or other artificial or computational intelligence algorithms or machine learning methods. The object identification module(s) 180 can include any suitable object recognition software. The object identification module(s) 180 can query the object image database for possible matches. For instance, images captured by the vehicle sensor(s) 132 (such as cameras) can be compared to images in the object data 122 for possible matches. Alternatively or in addition, measurements or other aspects of an object in the vehicle cabin data can be compared to measurements or other aspects of any images in the object data 122.

The object identification module(s) 180 can identify a detected object as a particular object if there is a match between the captured image/data of the object and an image or data in the object data 122. "Match" or "matches" means that an image or other information collected by the vehicle sensor(s) 132 and one or more of the images or other information in the object data 122 are substantially identical. For instance, an image or other information collected by the vehicle sensor(s) 132 and one or more of the images or other information in the object data 122 can match within a predetermined probability (e.g., at least about 85%, at least about 90%, at least about 95% or greater) or confidence level. In one or more arrangements, the detected object can be compared to identifying features of an object, such as color measured visually, shape, size, movement, sounds, etc.

In some arrangements, the object identification module(s) 180 can be configured to determine whether the detected object has a display. For example, if the object identification module(s) 180 identifies the object as a mobile device, the object identification module(s) 180 can determine whether the mobile device has a display. The object identification module(s) 180 can do so by analyzing the captured image/data of the object. Alternatively or additionally, the object identification module(s) 180 can be configured to assume that certain objects (e.g., a smart phone, tablet computer, etc.) have displays.

The object identification module(s) 180 can be configured to classify the identified object as a critical object or a non-critical object. A critical object can include an object or area that is important to the driver's ability to safely operate the vehicle. A non-critical object can include an object or an area that that is not important to the driver's ability to safely operate the vehicle or an object or area that could be hazardous to the driver's ability to safely operate the vehicle. The object identification module(s) 180 can do so based on classification information stored in the object data 122. However, the object identification module(s) 180 can do so in any suitable manner.

The distracted driving notification system 101 can include one or more distracted driving modules 190. The distracted driving module(s) 190 can be configured to responsive to detecting that the driver of the vehicle 100 is focused on a non-critical object located within the vehicle 100, determine an amount of time the driver is focused on the non-critical object. The distracted driving module(s) 190 can be configured to do so by, for example, causing the timer(s) 150 to begin counting.

The distracted driving module(s) 190 can be configured to compare the amount of time passed according to the timer(s) 150 to a threshold amount of time. In some arrangements, the threshold amount of time can be a predetermined amount of time (e.g., 4 seconds or less, 3 seconds or less, 2 seconds or less, or one second or less). In some arrangements, the threshold amount of time can be determine in real-time based on one or more real-time conditions of a current driving environment of the vehicle 100. The one or more real-time conditions include, for example, speed data, location data, weather data, environment data, or traffic data. Such real-time conditions can be obtained from the sensor(s) 130 (e.g., the vehicle sensor(s) 132 or the driving environment sensor(s) 136). The real-time conditions can be obtained from the data store(s) 120, such as the map data 126. The real-time conditions can be obtained from the remote information source(s) 220.

When the amount of time passed according to the timer(s) 150 does not exceed the threshold amount of time, the distracted driving module(s) 190 can be configured to take no action. However, when the amount of time passed according to the timer(s) 150 exceeds the threshold amount of time, the distracted driving module(s) 190 can be configured to cause a visual notification of distracted driving to be presented on or visually adjacent to the non-critical object. As an example, the distracted driving module(s) 190 can be configured to send a command to the non-critical object (e.g., a user device 210) located within the vehicle 100. The command can be to present a visual notification of distracted driving on the display of the non-critical object. Alternatively, if user device 210 does not have a display or if the user device is not communicatively coupled to the vehicle 100, the distracted driving module(s) 190 can be configured to cause the visual notification to be presented visually adjacent to the non-critical object. "Visually adjacent" includes one or more objects or one or more surfaces next to or within a field of view of the non-critical object on which a driver is focused. Thus, an object or surface that is visually adjacent to the non-critical object on which a driver is focused would be readily visible to a driver looking at the non-critical object. In some arrangements, "visually adjacent" includes one or more objects or one or more surfaces within a distance of the non-critical object on which a driver is focused. In some arrangements, the distance can be about 2 feet or less, 1.5 feet or less, 1 foot or less, 11 inches or less, 10 inches or less, 9 inches or less, 8 inches or less, 7 inches or less, 6 inches or less, 5 inches or less, 4 inches or less, 3 inches or less, 2 inches or less, or 1 inch or less, just to name a few possibilities.

The distracted driving module(s) 190 can be configured to identify a surface location for the visual notification to be presented. For instance, the distracted driving module(s) 190 can be configured to determine whether the non-critical object has a display. The distracted driving module(s) 190 can be configured to determine whether the non-critical object is communicatively coupled to the vehicle 100. The distracted driving module(s) 190 can be configured to assess an area around the non-critical object, such as using vehicle cabin data as acquired by the vehicle sensor(s) 132 and/or the vehicle map data 124. The distracted driving module(s) 190 can be configured to cause the visual notification to be presented on one of a display of the non-critical object, a display located visually adjacent to the non-critical object, and a surface located visually on or adjacent to the non-critical object. In some instances, the distracted driving module(s) 190 can be configured to initially try to cause the visual notification to be presented a display of the non-critical object. However, if the non-critical object does not have a display and/or if the non-critical object is communicatively coupled to the vehicle 100, then the distracted driving module(s) 190 can be configured to cause the visual notification to be presented on one of a display located visually adjacent to the non-critical object, a surface located on the non-critical objects, and a surface located visually adjacent to the non-critical object.

The visual notification of distracted driving can have any suitable content and/or form. The visual notification can be subtle in nature so as to apprise the driver of distract driving while not causing alarm to other vehicle occupants who may see the notification. In one or more arrangements, the visual notification can include the amount of time the driver is focused on the non-critical object. For example, the visual notification can be "seconds." The blank can correspond to the amount of time the driver has been focused on the non-critical object. The amount of time can be updated in real-time as the amount of time continues.

In some arrangements, the visual notification can include other symbols or indicators. As an example, the visual notification can include an arrow. The arrow can indicate how long the driver has been distracted relative to the driver's historical average of distracted driving or distracted driving with respect to that particular non-critical object. As an example, if the amount of time is below the driver's average, a down arrow can be presented next to the elapsed time. Or, if the amount of time is above the driver's average, an up arrow can be presented near the elapsed time. Other indicators can include color changes or other offsetting features (e.g., flashing) if the amount of time exceeds some additional time threshold. In some situations, additional notifications can be given using the output interface(s) 165. Such notifications can be audial, haptic, and/or olfactory in nature. As an example, a notification can be output by one or more speakers or by one or more haptic devices. The haptic devices can cause a vibration of the driver's seat or the steering wheel of the vehicle.

The visual notification can be presented over a surface. In some arrangements, when presented on the screen of a user device, the visual notification can be presented over a portion of the display such that the content of the display is partially obscured. In some arrangements, when presented on the screen of a user device, the visual notification can be presented over the entire display such that the content of the display is completely obscured. In some arrangements, the visual notification can be translucent so that a user can see the content beneath the visual notification.

The distracted driving module(s) 190 can be configured to make a record of instances of distracted driving. Such records can be store in the data store(s) 120. In some instances, the distracted driving module(s) 190 can be configured to record all instances of distracted driving over the threshold amount of time. The record can also indicate what objects are the focus of the distraction such that any new distracted driving data can be placed in context of the driver's history. Other information can be associated with the record, including, for example, conditions of the road, traffic, and vehicle data during the period of distracted driving. The distracted driving module(s) 190 can be configured to determine an average time of distract driving for the driver. In some arrangements, the distracted driving module(s) 190 can be configured to determine an average amount of time of distracted driving for specific object that are distracting the driver.

The various elements of the distracted driving notification system 101 can be communicatively linked through one or more communication networks 195. As used herein, the term "communicatively linked" can include direct or indirect connections through a communication channel or pathway or another component or system. A "communication network" means one or more components designed to transmit and/or receive information from one source to another. The communication network(s) 195 can be implemented as, or include, without limitation, a wide area network (WAN), a local area network (LAN), the Public Switched Telephone Network (PSTN), a wireless network, a mobile network, a Virtual Private Network (VPN), the Internet, and/or one or more intranets. The communication network(s) 195 further can be implemented as or include one or more wireless networks, whether short or long range. For example, in terms of short range wireless networks, the communication network(s) 195 can include a local wireless network built using a Bluetooth or one of the IEEE 802 wireless communication protocols, e.g., 802.11a/b/g/i, 802.15, 802.16, 802.20, Wi-Fi Protected Access (WPA), or WPA2. In terms of long range wireless networks, the communication network(s) 195 can include a mobile, cellular, and or satellite-based wireless network and support voice, video, text, and/or any combination thereof. Examples of long range wireless networks can include GSM, TDMA, CDMA, WCDMA networks or the like. The communication network(s) 195 can include wired communication links and/or wireless communication links. The communication network(s) 195 can include any combination of the above networks and/or other types of networks. The communication network(s) 195 can include one or more routers, switches, access points, wireless access points, and/or the like. In one or more arrangements, the communication network(s) 195 can include Vehicle-to-Vehicle (V2V), Vehicle-to-Infrastructure (V2I), or Vehicle-to-Everything (V2X) technology.

One or more elements of the distracted driving notification system 101 can include and/or can execute suitable communication software, which enables two or more of the elements to communicate with each other through the communication network(s) 195 and perform the functions disclosed herein.

Figure 2:
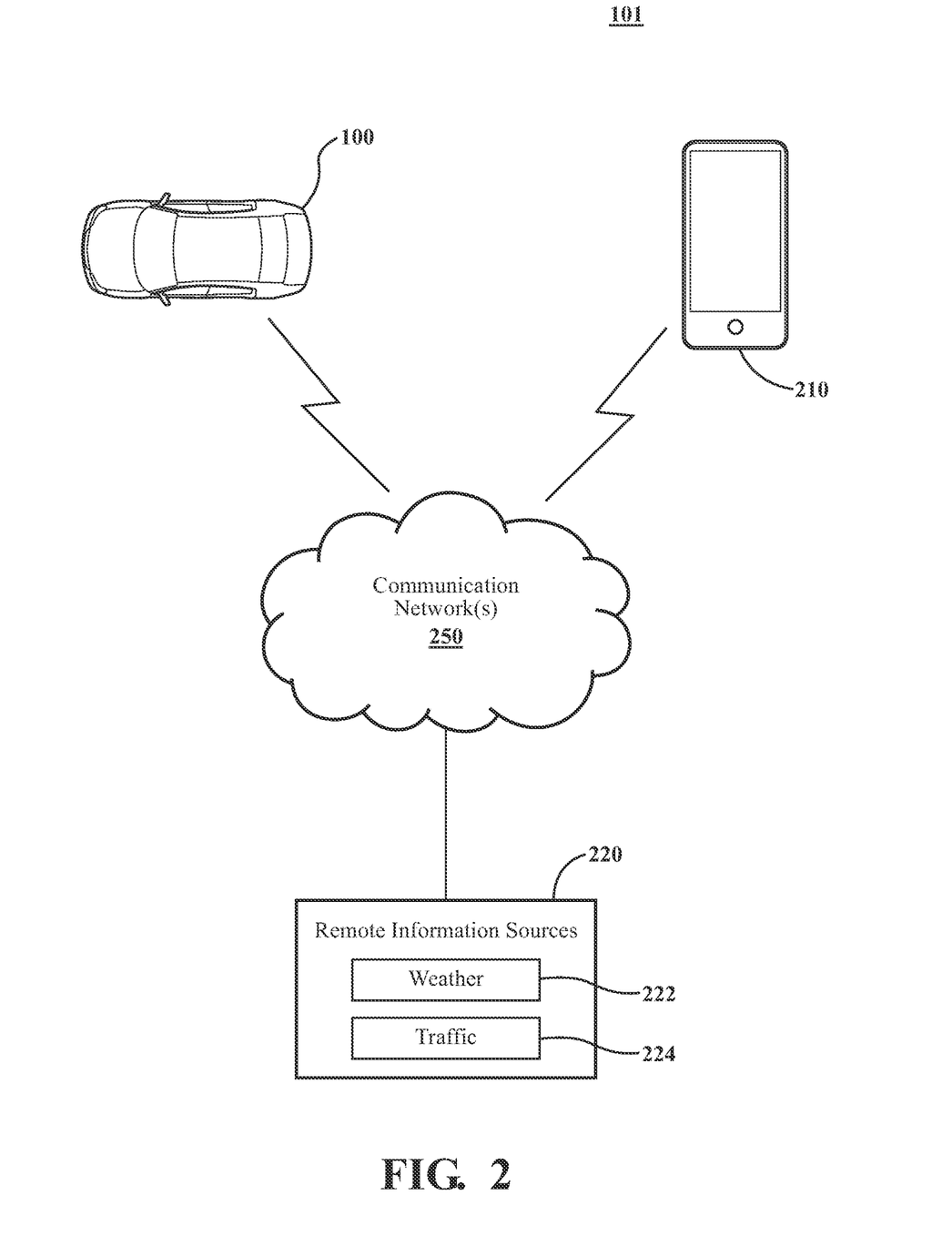
FIG. 2 is an example of further aspects of the distracted driving notification system.

FIG. 2 is an example of further potential aspects of the distracted driving notification system 101. In some arrangements, the vehicle 100 (or one or more components thereof) can be operatively connected to other items, devices, sources, or entities that can facilitate the operation of the distracted driving notification system 101. For example, the vehicle 100 (or one or more components thereof) can be operatively connected to one or more user devices 210 and/or one or more remote information sources 220, just to name a few possibilities. It will be understood that it is not necessary for the distracted driving notification system 101 to have all of the elements shown in FIG. 2 or described herein.

The user device(s) 210 can be any suitable device that can be carried by a human, including, for example, a cellular telephone, a smart phone, a personal digital assistant ("PDA"), a tablet computer, a fitness tracker, an activity tracker, a digital reader, a handheld device having wireless connection capability, a computer (e.g., a laptop), a portable computing device, an entertainment device (e.g., an audio or video device). The user device(s) 210 can be configured to communicate with the vehicle 100 via a wireless medium. In one or more arrangements, the user device(s) 210 can be configured so as to be wearable by a user. For instance, the user device(s) 210 can be a smart watch, smart eye glasses, smart jewelry (e.g., neckless, earrings, bracelets, etc.), and/or smart clothing (e.g., a shirt, hat or other article of clothing enabled for wireless communication).

The remote information source(s) 220 can be any suitable source of information that can be used by the distracted driving notification system 101. The vehicle 100 or any element of the vehicle 100 can be configured to obtain information from the remote information source(s) 220, such as by a communication system. The remote information source(s) 220 can include third party sources.

The remote information source(s) 220 can include weather data 222. For instance, the remote information source(s) 220 can include a weather database, a weather news source, an online weather database, a weather-related website, the radio, television, or other suitable source. Such data can include present, past and/or future weather data. Future weather data includes predicted conditions based on one or more factors. The weather data can include real-time weather conditions and/or road conditions (e.g. wet roads, snow on the roads, etc.) in a particular area.

The remote information source(s) 220 can include traffic data 224. For instance, the remote information source(s) 220 can include a traffic database, a traffic news source, an online traffic database, a traffic-related website, the radio, television, or other suitable source. Such data can include present, past and/or future traffic data. Future traffic data includes predicted conditions based on one or more factors. The traffic data can include real-time traffic conditions and/or road conditions in a particular area, on a particular road, on a route, etc.

The vehicle 100, the user device(s) 210, and/or the remote information source(s) 220 can be communicatively linked through one or more communication networks 250. The discussion of "communicatively linked" and "communication network" above in connection with FIG. 1 applies equally here. The vehicle 100, the user device(s) 210, and/or the remote information source(s) 220 can include and/or can execute suitable communication software, which enables two or more of the elements to communicate with each other through the communication network(s) 250 and perform the functions disclosed herein.

Now that the various potential systems, devices, elements and/or components of a distracted driver notification system have been described, various methods will now be described. Various possible steps of such methods will now be described. The methods described may be applicable to the arrangements described above, but it is understood that the methods can be carried out with other suitable systems and arrangements. Moreover, the methods may include other steps that are not shown here, and in fact, the methods are not limited to including every step shown. The blocks that are illustrated here as part of the methods are not limited to the particular chronological order. Indeed, some of the blocks may be performed in a different order than what is shown and/or at least some of the blocks shown can occur simultaneously.

Figure 3:
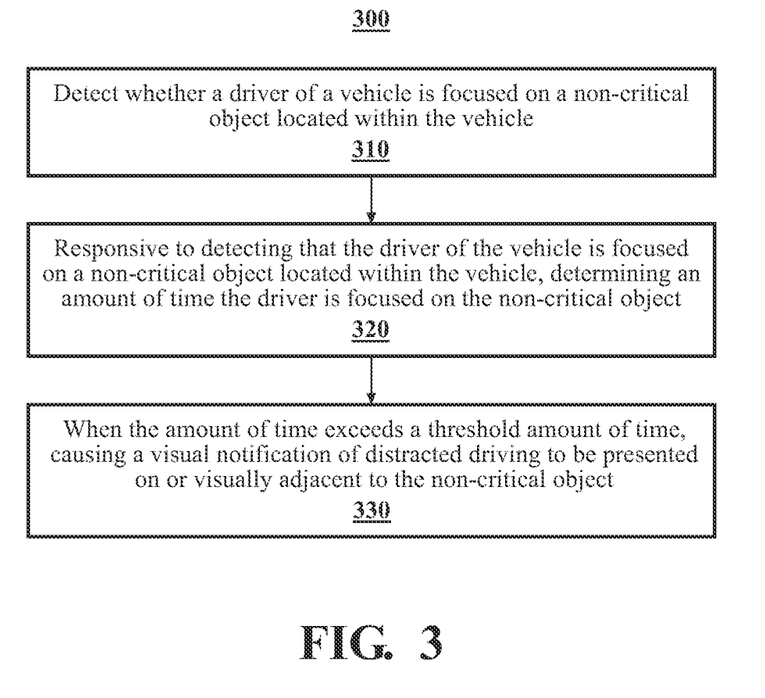
FIG. 3 is an example of a distracted driving notification method.

Turning to FIG. 3, an example of a distracted driver notification method 300 is shown. At block 310, it can be detected whether the driver of a vehicle is focused on a non-critical object located within the vehicle. Such detection can be performed by the driver focus module(s) 170, the processor(s) 110, and/or other module(s) using data acquired by one or more sensors 130. In some arrangements, the detection can be performed using driver gaze data. Driver gaze data can be acquired by the driver gaze sensor(s) 134. The driver gaze data can include eye position data, eye orientation data, head position data, and/or head orientation data. In some arrangements, the driver focus module(s) 170, the object identification module(s) 180, the processor(s) 110, and/or other module(s) can determine whether the driver is focused on a non-critical object. Data about the non-critical object can be acquired by the vehicle sensor(s) 132. The distracted driver notification method 300 can continue to block 320.

At block 320, in response to detecting that the driver of the vehicle is focused on a non-critical object located within the vehicle, an amount of time the driver is focused on the non-critical object can be determined. The determining can be performed by the timer(s) 150, the distracted driving module(s) 190, other module(s), and/or the processor(s) 110. The distracted driver notification method 300 can continue to block 330.

At block 330, when the counted amount of time exceeds a threshold amount of time, a visual notification of distracted driving can be caused to be presented on a display of the non-critical object, a display located visually adjacent to the non-critical object, or a surface located visually adjacent to the non-critical object on or visually adjacent to the non-critical object. Such causing can be performed by the distracted driving module(s) 190, other module(s), the output interface(s) 165, and/or the processor(s) 110.

After block 330, the distracted driver notification method 300 can end. Alternatively, the distracted driver notification method 300 can return to block 310 or some other block. In some instances, the distracted driver notification method 300 can end responsive to detecting that the driver of the vehicle is no longer focused on the non-critical object located within the vehicle. In such case, the presenting of the visual notification can be caused to be discontinued. Such detecting and/or causing can be performed by the distracted driving module(s) 190, other module(s), the output interface(s) 165, and/or the processor(s) 110.

The distracted driver notification method 300 can be performed continuously, periodically, irregularly, randomly, or responsive to a condition, event, or input. The distracted driver notification method 300 can include additional and/or alternative steps to those describe above. For example, the distracted driver notification method 300 can include determining the threshold amount of time based on one or more real-time conditions of a current driving environment of the vehicle. As another example, the distracted driver notification method 300 can include determining whether the non-critical object includes a display and, responsive to determining that the non-critical object does not include a display, causing the visual notification to be presented on one of the display located visually adjacent to the non-critical object or the surface located visually adjacent to the non-critical object. As still another example, the distracted driver notification method 300 can include detecting an object in the vehicle, and determining whether the detected object is a non-critical object.

Figure 4:
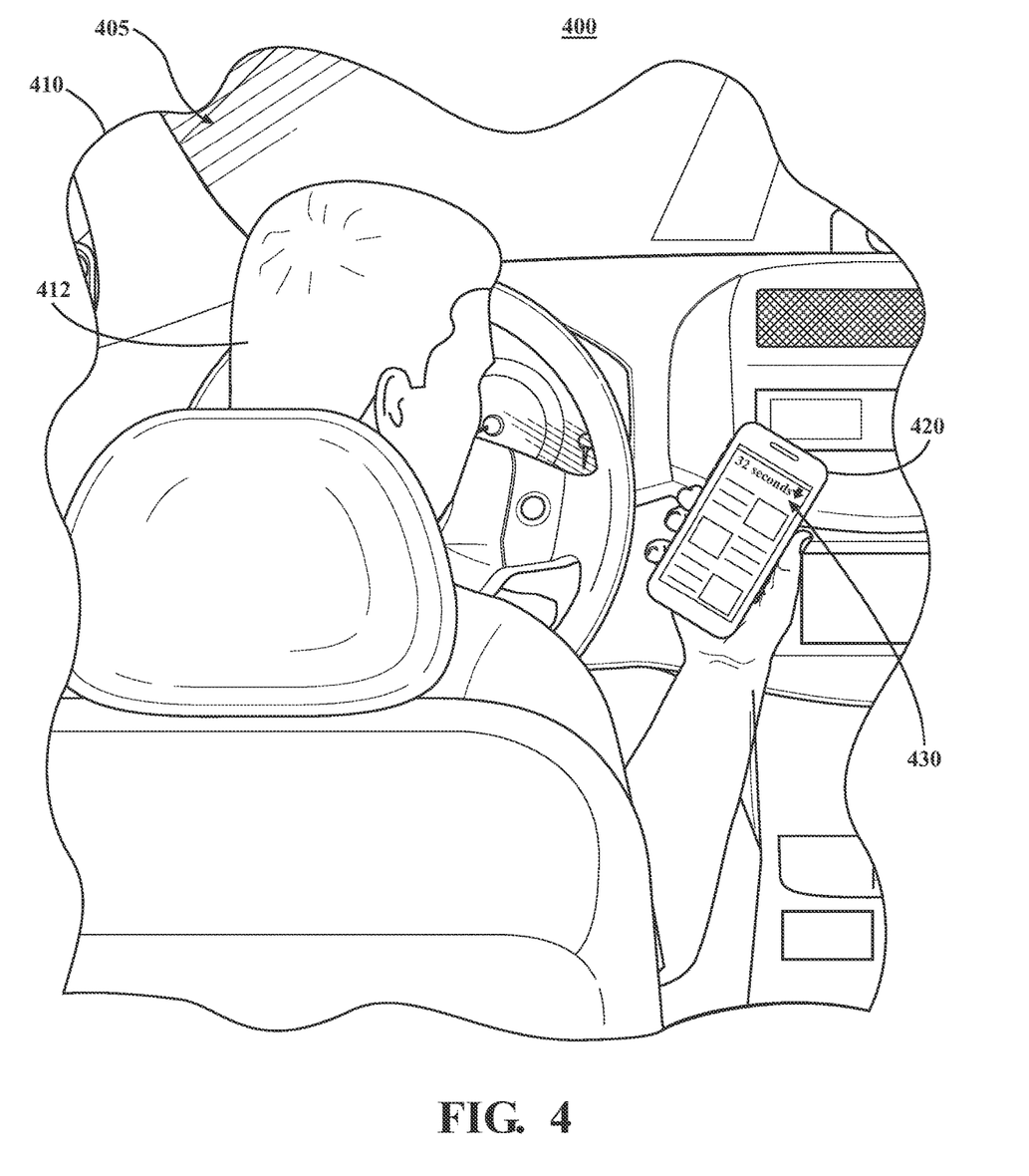
FIG. 4 is a first example of a distracted driving notification scenario.

Non-limiting examples of the above-described systems, methods and/or arrangements will now be described. FIG. 4 is a first example of a distracted driving notification scenario. 400. FIG. 4 shows an example of a cabin 405 of a vehicle 410 configured to detect distracted driving and provide distracted driving notifications. The vehicle occupants can include a driver 412.

In this example the driver 412 of the vehicle 410 can be looking downwardly at a cellular phone 420, a non-critical object. Thus, the driver 412 is looking away from the road and is distracted.

When the distracted driving module(s) 190 and/or the processor(s) 110 detect that the driver 412 is looking away from the road and at the cellular phone 420, the distracted driving module(s) 190 and/or the processor(s) 110 can cause the timer(s) 150 to be started. The amount of time counted by the timer(s) 150 can be compared to a threshold amount of time (e.g., 3 seconds). When the amount of time elapsed on the timer(s) 150 exceeds the threshold amount of time, the distracted driving module(s) 190 and/or the processor(s) 110 can cause a visual notification 430 to be presented on the cellular phone 420. For example, the distracted driving module(s) 190 and/or the processor(s) 110 can push a notification to the cellular phone 420 so the driver 412 is aware of how long he or she has been looking away from the road.

The visual notification 430 can be "_____ seconds." The number can be updated in real-time as the driver 412 continues to look at cellular phone 420. The visual notification 430 can inform the driver that he or she is looking at the cellular phone 420 for the indicated amount of time. Thus, the visual notification 430 can be an encouraging reminder to the driver 412 to refocus on the road. However, it is ultimately up to the driver 412 to act upon the visual notification 430.

The visual notification 430 does not indicate that the "_____ seconds refers to the period of distracted driving. Thus, if other occupants of the vehicle 410 see the visual notification 430, they would not understand the meaning of the visual notification 430. As such, the visual notification 430 is less likely to be distressing to any passengers who are not involved with the distraction.

Figure 5:
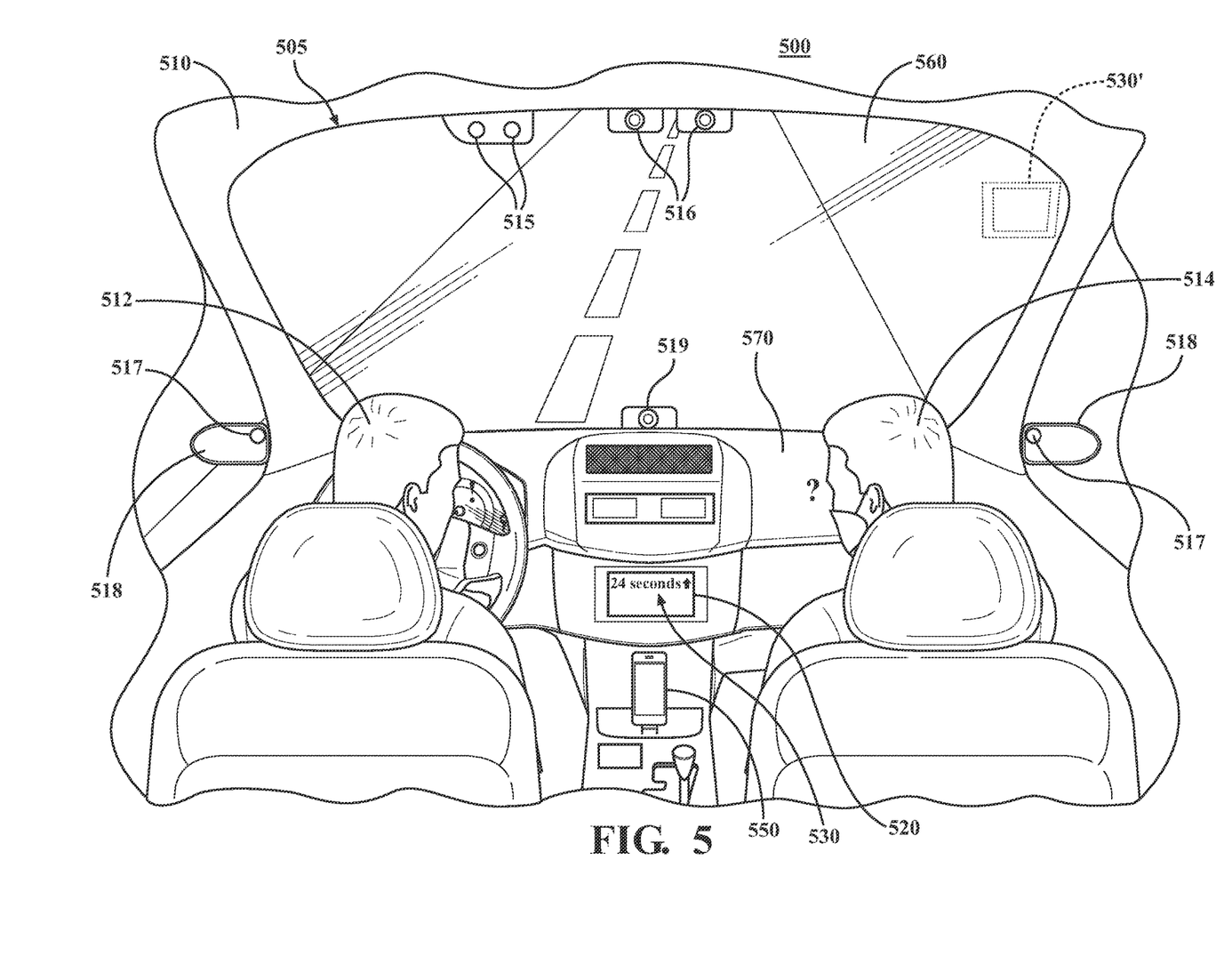
FIG. 5 is a second example of a distracted driving notification scenario.

FIG. 5 is a second example of a distracted driving notification scenario 500. FIG. 5 shows an example of a cabin 505 of a vehicle 510 configured to detect distracted driving and provide distracted driving notifications. The vehicle occupants can include a driver 512 and a passenger 514.

The vehicle 510 can include one or more cameras 515 configured to acquire driver gaze data (e.g., cameras positioned to acquire driver head position data, driver head orientation data, driver eye position data, and/or driver eye orientation data). The vehicle 510 can include one or more one or more cameras 516 configured to acquire vehicle cabin data, including data about one or more objects located within the cabin 505. In some arrangements, the vehicle 510 can include one or more cameras 517 in the side view mirrors 518 to acquire driver gaze data and/or vehicle cabin data. The vehicle 510 can include one or more cameras 519 or other sensors configured to acquire driving environment data.

In this example the driver 512 of the vehicle 510 can be looking downwardly at an infotainment screen 520. Thus, the driver 512 is looking away from the road and is distracted.

When the distracted driving module(s) 190 and/or the processor(s) 110 detects that the driver 512 is looking away from the road and at the infotainment screen 520, the distracted driving module(s) 190 and/or the processor(s) 110 can cause the timer(s) 150 to be started. The amount of time counted by the timer(s) 150 can be compared to a threshold amount of time (e.g., 3 seconds). When the amount of time elapsed exceeds the threshold, the distracted driving module(s) 190 and/or the processor(s) 110 can cause a visual notification 530 to be presented on the infotainment screen 520.

The visual notification 530 can be "24 seconds." The number can be updated in real-time as the driver continues to look toward the infotainment screen 520. The visual notification 530 can inform the driver that he or she is looking at the infotainment screen 520 for the period of time. However, the visual notification 530 does not convey to the passenger what is meant by the counter. Thus, no cause for alarm by the passenger is raised. When the driver 512 sees the visual notification 530, the driver 512 can decide whether or not to take any action in response.

While the visual notification 530 is presented on the infotainment screen 520 in this example, it will be appreciated that the visual notification 530 can be presented in other areas of the cabin 505. For instance, the visual notification 530 can be presented on a display of a cellular phone 550 located near the infotainment screen 520. Alternatively, the visual notification 530 can be presented on a surface of the windshield 560 or dashboard 570 of the vehicle 510. For example, the visual notification 530 can be a projection 530' presented by one or more projectors located within the cabin 505. Alternatively, the projection 530' can be presented on any other object within or surface of the vehicle 510, the driver's lap, or even onto a passenger.

It will be appreciated that arrangements described herein can provide numerous benefits, including one or more of the benefits mentioned herein. Arrangements described herein can inform a driver of how long he or she has had his or her eyes off of the road. Arrangements described herein can display an amount of time the driver is looking away from the road. Arrangements described herein can make the driver aware of the risk of looking away from traffic while driving. Arrangements described herein can help to make the driver want to look back at the road and focus on driving. Arrangements described herein can be subtle and not aggressive (as opposed to an annoying audio cue). Thus, arrangements described herein can be designed to increase the likelihood that drivers will accept the system. Arrangements described herein do not try to teach or manipulate the driver, as the driver can decide what to do with the information. Arrangements described herein can provide a real-time visual notification of distractive driving to a driver. Arrangements described herein can provide a visual notification that informs and inoffensively encourages the driver to change behavior. Arrangements described herein can present a visual notification in a manner that does not alert and/or cause alarm to others in the vehicle.

The foregoing description is provided for purposes of illustration and description and is in no way intended to limit the disclosure, its application, or uses. It is not intended to be exhaustive or to limit the disclosure. Individual elements or components of a particular embodiment are generally not limited to that embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The term "or" is intended to mean an inclusive "or" rather than an exclusive "or." The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

The headings (such as "Background" and "Summary") and sub-headings used herein are intended only for general organization of topics within the present disclosure and are not intended to limit the disclosure of the technology or any aspect thereof. The recitation of multiple embodiments having stated components is not intended to exclude other embodiments having additional components, or other embodiments incorporating different combinations of the stated components.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or components does not exclude other embodiments of the present technology that do not contain those elements or components.

As used herein, the term "about" includes exactly the term or number that it modifies and slight variations therefrom. "Slight variations therefrom" can include within 15 degrees/percent/units or less, within 14 degrees/percent/units or less, within 13 degrees/percent/units or less, within 12 degrees/percent/units or less, within 11 degrees/percent/units or less, within 10 degrees/percent/units or less, within 9 degrees/percent/units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degree/percent/unit or less. In some instances, "about" can include being within normal manufacturing tolerances.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

What is claimed is:

1. A distracted driver notification system comprising:
   one or more sensors configured to acquire driver gaze data;
   a timer;
   one or more processors operatively connected to the one or more sensors and to the timer, the one or more processors being configured to:
   detect, using driver gaze data, whether a driver of a vehicle is focused on a non-critical object located within the vehicle;
   responsive to detecting that the driver of the vehicle is focused on a non-critical object located within the vehicle, determining an amount of time the driver is focused on the non-critical object by counting using the timer; and
   when the amount of time exceeds a threshold amount of time, cause a visual notification of distracted driving to be presented on or visually adjacent to the non-critical object, the visual notification including the amount of time the driver is focused on the non-critical object, the amount of time being updated in real-time in the visual notification.

2. The distracted driver notification system of claim 1, wherein the visual notification is presented on one of a display of the non-critical object, a display located visually adjacent to the non-critical object, and a surface located visually on or adjacent to the non-critical object.

3. The distracted driver notification system of claim 1, wherein the one or more sensors include one or more cameras.

4. The distracted driver notification system of claim 1, wherein the driver gaze data includes at least one of driver eye position data, driver eye orientation data, driver head position data, and driver head orientation data.

5. The distracted driver notification system of claim 1, wherein the one or more processors are further configured to:
   determine the threshold amount of time based on one or more real-time conditions of a current driving environment of the vehicle.

6. The distracted driver notification system of claim 5, wherein the one or more real-time conditions include at least one of: speed data, location data, weather data, environment data, or traffic data.

7. The distracted driver notification system of claim 1, wherein the threshold amount of time is a predetermined amount of time.

8. The distracted driver notification system of claim 1, wherein the one or more processors are further configured to:
   determine whether the non-critical object includes a display; and
   responsive to determining that the non-critical object does not include a display, cause the visual notification to be presented on one of: a display located visually adjacent to the non-critical object or a surface located visually adjacent to the non-critical object.

9. The distracted driver notification system of claim 1, wherein the one or more processors are further configured to:
responsive to detecting that the driver of the vehicle is no longer focused on the non-critical object located within the vehicle, causing the visual notification of distracted driving to be discontinued.

10. The distracted driver notification system of claim 1, wherein detecting whether the driver of a vehicle is focused on the non-critical object located within the vehicle further includes:
detecting an object in the vehicle; and
determining whether the object is a non-critical object.

11. The distracted driver notification system of claim 1, wherein cause a visual notification of distracted driving to be presented on or visually adjacent to the non-critical object includes send a command to the non-critical object to present the visual notification of distracted driving on a display of the non-critical object.

12. A distracted driver notification method comprising:
detecting whether a driver of a vehicle is focused on a non-critical object located within the vehicle;
responsive to detecting that the driver of the vehicle is focused on a non-critical object located within the vehicle, determining an amount of time the driver is focused on the non-critical object by counting using a timer; and
when the amount of time exceeds a threshold amount of time, cause a visual notification of distracted driving to be presented on or visually adjacent to the non-critical object, the visual notification including the amount of time the driver is focused on the non-critical object, the amount of time being updated in real-time in the visual notification.

13. The distracted driver notification method of claim 12, wherein cause a visual notification of distracted driving to be presented on or visually adjacent to the non-critical object includes cause a visual notification of distracted driving to be presented on one of: a display of the non-critical object, a display located visually adjacent to the non-critical object, and a surface located on or visually adjacent to the non-critical object.

14. The distracted driver notification method of claim 12, further including:
acquiring data at least one of driver eye position data, driver eye orientation data, driver head position data, and driver head orientation data, and
wherein detecting whether the driver of a vehicle is focused on the non-critical object located within the vehicle is based on the at least one of driver eye position data, driver eye orientation data, driver head position data, and driver head orientation data.

15. The distracted driver notification method of claim 12, further including:
determining the threshold amount of time based on real-time conditions of a current driving environment of the vehicle.

16. The distracted driver notification method of claim 12, further including:
determining whether the non-critical object includes a display; and
responsive to determining that the non-critical object does not include a display, causing the visual notification to be presented on one of a display located visually adjacent to the non-critical object or a surface located visually adjacent to the non-critical object.

17. The distracted driver notification method of claim 12, further including:
responsive to detecting that the driver of the vehicle is no longer focused on the non-critical object located within the vehicle, causing the visual notification of distracted driving to be discontinued.

18. The distracted driver notification method of claim 12, wherein detecting whether the driver of a vehicle is focused on the non-critical object located within the vehicle further includes:
detecting an object in the vehicle; and
determining whether the object is a non-critical object.

* * * * *